March 17, 1964 D. R. VON RECKLINGHAUSEN 3,125,640

STEREOPHONIC-BROADCAST INDICATING SYSTEM AND THE LIKE

Filed May 22, 1962

INVENTOR

DANIEL R. vonRECKLINGHAUSEN

BY Rines and Rines

ATTORNEYS

United States Patent Office 3,125,640

Patented Mar. 17, 1964

3,125,640

STEREOPHONIC-BROADCAST INDICATING SYSTEM AND THE LIKE

Daniel R. von Recklinghausen, Arlington, Mass., assignor to H. H. Scott, Inc., Maynard, Mass., a corporation of Massachusetts Filed May 22, 1962, Ser. No. 196,829
5 Claims. (Cl. 179—15)

Figure 1:
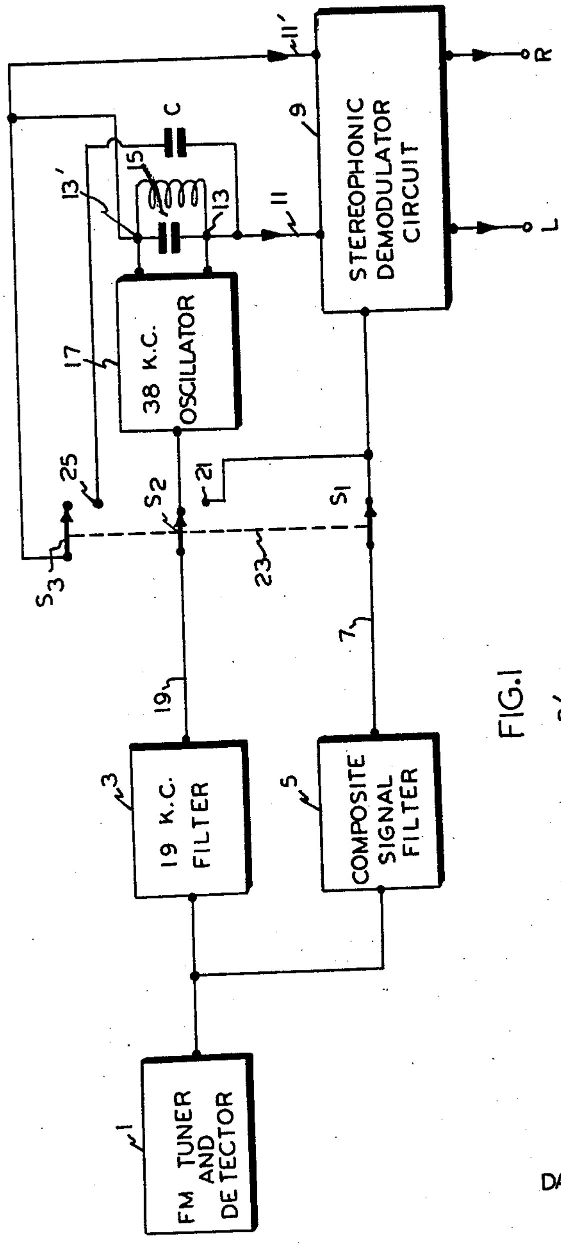

The present invention relates to broadcast-indicating circuits and particularly to indicating circuits for demonstrating the transmission of stereophonic broadcast transmissions and the like.

As described in my article entitled "Stereophonic FM Receivers and Adapters," appearing in the November, 1961 issue of the Institute of Radio Engineers Transactions on Broadcast and Television Receivers, volume BTR–7, No. 3, pages 66–71, stations transmitting stereophonic signals provide, in addition to the main-channel-signal frequency-modulated carrier, a sub-channel 38-kilocycle second-signal-modulated sub-carrier, and a pilot signal of the order of 19-kilocycles frequency. The main-channel and sub-channel signal modulations comprise a pair of stereophonic signals. The pilot frequency is utilized at the receiver to aid in producing a 38-kilocycle re-insert carrier oscillation that is employed in the demodulation of the stereophonic signals and the separation of the same, as discussed in my said article and as hereinafter more fully explained.

One of the ways of indicating the transmission of stereophonic broadcast signals is by filtering out the received 19-kilocycle pilot frequency and rectifying the same to provide an indication that stereophonic broadcasting is in process. Unfortunately, however, the mere rectification of the output signal of a 19-kilocycle filter is not a reliable indication that stereophonic broadcasting is actually in progress. The 19-kilocycle pilot frequency is transmitted with an 8-to-10% maximum modulation or deviation of the carrier, so that only in the case of low tuner gain is the filter output a reliable indication that the 19-kilocycle signal is being received and that stereophonic transmissions are being effected. If the tuner gain is high, even in the absence of station transmissions, the signal output of the 19-kilocycle filter due to noise alone is of the same magnitude as, or of greater magnitude than, the 19-kilocycle signal, so that false indications would be provided by relying upon the presence of output from the filter.

An object of the present invention, accordingly, is to provide a new and improved technique, that shall not be subject to the false indications above-discussed, for indicating the transmission of stereophonic broadcast signals and the like.

A further object is to provide an indicator of specific broadcast transmissions of more general utility, as well.

Still a further object is to provide a new and improved circuit of the character described by synchronously changing the frequency of the re-insert carrier associated with the demodulator circuit and simultaneously producing an audible beat-frequency tone indicative of the reception of transmissions from a stereophonic broadcast station.

Still an additional object is to provide a new and improved radio-transmission indicating apparatus.

In summary, the invention relates to apparatus for indicating the transmission of a frequency-modulated carrier containing a pilot-frequency modulation, said apparatus having, in combination, tuner means for receiving and detecting the carrier, a filter tuned to the pilot frequency and connected to the tuner for extracting the pilot frequency from the detected carrier, optional means connected to the pilot frequency filter for producing one or more harmonics of the pilot frequency, oscillator means connected to the filter and tuned for producing oscillations synchronized with and a multiple of the pilot frequency, demodulator means connected with the oscillator means and the tuner means, means for re-tuning the oscillator means to a frequency separated by an audible beat frequency from the pilot frequency or its harmonics, and means for disconnecting the tuner means from and connecting the filter means to the demodulator means. Preferred constructional details are hereinafter set forth.

Other and further objects will be later explained and will be more particularly delineated in the appended claims.

Figure 2:
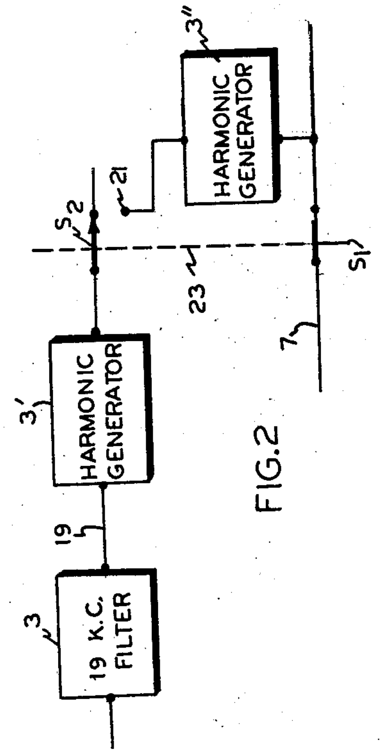

The invention will now be described in connection with the accompanying drawing FIG. 1 of which is a schematic block-and-circuit diagram illustrating the invention in preferred form; and FIG. 2 is a similar diagram of a modification.

Referring to the drawing, a conventional frequency-modulation tuner and detector is shown at 1 followed by a 19-kilocycle filter 3 for removing the before-mentioned 19-kilocycle or other pilot-tone frequency. The tuner 1 is connected through a composite signal filter 5 for passing the main and sub-channel modulations (such as a 53-kilocycle low-pass filter) and by way of conductor 7 and a switch $S_1$, shown in its upper position, to a conventional stereophonic demodulator circuit 9, as of the type described in my said article. The sub-channel carrier frequency (38 kilocycles, in the above example) is applied from an oscillator 17 to the stereophonic demodulator circuit 9, by way of the push-pull connections 11 and 11', from the opposite terminals 13' and 13 of the inductance-capacitance tuned circuit 15 associated with the 38-kilocycle re-insert carrier oscillator 17. The 38-kilocycle sub-channel signal may thus be demodulated, as described in my said article. The 38-kilocycle oscillator 17 is tuned to a frequency double the 19-kilocycle output of the filter 3 and is synchronized from the output of the filter 3 by way of the connection 19, which may optionally include harmonic generator 3', FIG. 2, such as a series-connected diode or diodes, through a further switch $S_2$, when in its upper position, as shown.

In accordance with the invention, when it is desired to indicate whether stereophonic broadcast signals are or are not being transmitted, the switch $S_2$ will be moved downward, to its lower position, into engagement with the terminal 21, whereby the output of the 19-kilocycle filter 3 and its optional 19-kilocycle harmonic generator 3'', FIG. 2 (such as one or more diodes, as before-mentioned) will be connected through the switch $S_2$ and the contact 21 directly to the stereophonic demodulator circuit 9, producing a 19-kilocycle input therein or an harmonic of 19 kilocycles. In view of the ganged-connection 23 between the switches $S_1$, $S_2$, and a later-described switch $S_3$, the switch $S_1$ will be simultaneously moved to its downward or open position, disconnecting the composite signal filter 5 and thus the output of the tuner 1 from the stereophonic demodulator circuit 9. At the same time, also in view of the ganged-connection 23, the before-mentioned further switch $S_3$ will be moved from its indicated position to its lower contact terminal 25, whereby a further capacitor C, for example, will be shunted across the tuned circuit 15, detuning the same to the order of the 19-kilocycle output of the filter 3 or an harmonic thereof, as in FIG. 2; preferably, to a frequency separated therefrom by an audible beat. There will therefore be injected into the demodulator circuit 9, by the push-pull connection 11, 11', a frequency differing by a beat-frequency in the audible range from the 19-kilocycle frequency or harmonic thereof fed through the switch $S_2$ and the contact terminal 21. There will result in the output of the stereophonic demodulator circuit 9, the said beat frequency which, after transducing in a loudspeaker or other output, schematically illustrated at L and R, will register itself as an audible beat tone, indicating that stereophonic broadcast transmissions are being received.

A further feature of the invention resides in the fact that the adjustment of the tuner 1 to obtain a pure beat tone at L, R, enables fine tuning of the receiver to the transmitting station. Movement of the switches $S_1$, $S_2$, $S_3$ synchronously back to their upper shown positions, will then enable proper stereophonic broadcast reception and demodulation in the fashion described in the said article.

Further modifications will occur to those skilled in the art and all such are considered to fall within the spirit and scope of the invention as defined in the appended claims.

What is claimed is:

1. Apparatus for indicating the transmission of a frequency-modulated carrier containing a pilot-frequency modulation, said apparatus having in combination, tuner means for receiving and detecting the carrier, a filter tuned to the pilot frequency and connected to the tuner for extracting the pilot frequency from the detected carrier, oscillator means connected to the filter and tuned for producing oscillations synchronized with and a multiple of the pilot frequency, demodulator means connected with the oscillator means and the tuner means, means for retuning the oscillator means to a frequency separated by an audible beat frequency from the pilot frequency, and means for disconnecting the tuner means from and connecting the filter means to the demodulator means.

2. Apparatus for indicating the transmission of a frequency-modulated carrier containing a pilot-frequency modulation, said apparatus having, in combination, tuner means for receiving and detecting the carrier, a filter tuned to the pilot frequency and connected to the tuner for extracting the pilot frequency from the detected carrier, oscillator means connected to the filter and tuned for producing oscillations synchronized with the pilot frequency, demodulator means connected with the oscillator means and the tuner means, means for retuning the oscillator means to a frequency separated by a beat frequency from the pilot frequency, and means for disconnecting the tuner means from and connecting the filter means to the demodulator means.

3. Apparatus as claimed in claim 1 and in which the retuning means comprises a switched circuit for changing the oscillator tuned-circuit resonance frequency, and the disconnecting-and-connecting means comprises further switching means controlled synchronously with the said switched circuit.

4. Apparatus for indicating the transmission of a frequency-modulated carrier containing a pilot-frequency modulation, said apparatus having, in combination, tuner means for receiving and detecting the carrier, a filter tuned to the pilot frequency and connected to the tuner for extracting the pilot frequency from the detected carrier, oscillator means connected with the filter and tuned for producing oscillations synchronized with and a multiple of the pilot frequency, demodulator means connected with the oscillator means and the tuner means, means for retuning the oscillator means to a frequency separated by an audible beat frequency from an harmonic of the pilot frequency, and means for disconnecting the tuner means from and connecting the filter means through an harmonic generator to the demodulator means.

5. Apparatus as claimed in claim 4 in which an harmonic generator is connected in the output of the said filter.

No references cited.